United States Patent
Ammon et al.

(10) Patent No.: US 9,849,886 B2
(45) Date of Patent: Dec. 26, 2017

(54) METHOD FOR COMBINED DETERMINING OF A MOMENTARY ROLL ANGLE OF A MOTOR VEHICLE AND A MOMENTARY ROADWAY CROSS SLOPE OF A CURVED ROADWAY SECTION TRAVELED BY THE MOTOR VEHICLE

(71) Applicant: Daimler AG, Stuttgart (DE)

(72) Inventors: Dieter Ammon, Remseck (DE);
Claus-Michael Hainbuch, Weinstadt (DE); Magnus Rau, Kirchheim unter Teck (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/654,419

(22) PCT Filed: Oct. 31, 2013

(86) PCT No.: PCT/EP2013/003286
§ 371 (c)(1),
(2) Date: Jun. 19, 2015

(87) PCT Pub. No.: WO2014/094933
PCT Pub. Date: Jun. 26, 2014

(65) Prior Publication Data
US 2016/0001783 A1    Jan. 7, 2016

(30) Foreign Application Priority Data

Dec. 20, 2012   (DE) .................. 10 2012 024 971

(51) Int. Cl.
*B60W 40/112*     (2012.01)
*B60W 40/06*      (2012.01)
*B60G 17/016*     (2006.01)

(52) U.S. Cl.
CPC ....... *B60W 40/112* (2013.01); *B60G 17/0162* (2013.01); *B60W 40/06* (2013.01);
(Continued)

(58) Field of Classification Search
None
See application file for complete search history.

(56) References Cited

U.S. PATENT DOCUMENTS 5,446,658 A  *  8/1995  Pastor ............... B60G 17/019
                                                        701/1
6,556,908 B1 *  4/2003  Lu .................... B60G 17/0185
                                                        701/36
(Continued)

FOREIGN PATENT DOCUMENTS

CN      101282871 A    10/2008
DE      102 20 575 A1  12/2003
(Continued)

OTHER PUBLICATIONS

Chinese Office Action issued in counterpart application No. 201380065551.X dated May 19, 2016, with partial English translation (Twelve (12) pages).

(Continued)

*Primary Examiner* — John R. Olszewski
*Assistant Examiner* — David Merlino
(74) *Attorney, Agent, or Firm* — Crowell & Moring LLP

(57) ABSTRACT

A method and device for the combined determining of a momentary vehicle roll angle of a motor vehicle and a momentary roadway cross slope of a curved roadway section traveled by the motor vehicle is disclosed. The momentary vehicle roll angle and momentary roadway cross slope are determined from chassis data and transverse dynamics data of the motor vehicle.

2 Claims, 3 Drawing Sheets

(52) U.S. Cl.
CPC ............... *B60G 2400/0511* (2013.01); *B60G 2400/0523* (2013.01); *B60G 2400/104* (2013.01); *B60G 2400/204* (2013.01); *B60G 2400/52* (2013.01); *B60G 2400/60* (2013.01); *B60G 2800/70* (2013.01); *B60G 2800/9123* (2013.01); *B60W 2520/10* (2013.01); *B60W 2520/125* (2013.01); *B60W 2520/14* (2013.01); *B60W 2520/18* (2013.01)

(56) References Cited

U.S. PATENT DOCUMENTS

| | | | |
|---|---|---|---|
| 6,631,317 B2* | 10/2003 | Lu | B60G 17/016 701/45 |
| 2003/0236606 A1* | 12/2003 | Lu | B60G 17/0162 701/70 |
| 2004/0162654 A1* | 8/2004 | Lu | B60G 17/0162 701/38 |
| 2005/0033486 A1 | 2/2005 | Schmitt et al. | |
| 2006/0089771 A1* | 4/2006 | Messih | B60W 40/112 701/45 |
| 2007/0067085 A1* | 3/2007 | Lu | B60W 40/112 701/70 |
| 2007/0106442 A1* | 5/2007 | Lu | B60W 40/13 701/38 |
| 2007/0162204 A1* | 7/2007 | Moshchuk | B60W 40/112 701/38 |
| 2009/0254250 A1* | 10/2009 | Koo | B60W 40/12 701/38 |
| 2009/0299579 A1* | 12/2009 | Hac | B60W 40/112 701/46 |
| 2016/0068166 A1* | 3/2016 | Chen | B60W 40/112 701/32.9 |

FOREIGN PATENT DOCUMENTS

| | | |
|---|---|---|
| DE | 10 2004 035 578 A1 | 2/2006 |
| DE | 10 2006 018 978 A1 | 11/2007 |
| DE | 10 2010 046 317 A1 | 3/2012 |
| EP | 0 940 273 A2 | 9/1999 |
| EP | 1 346 856 A2 | 9/2003 |
| EP | 1 386 808 A1 | 2/2004 |
| EP | 2 127 989 A1 | 12/2009 |

OTHER PUBLICATIONS

PCT/EP2013/003286, International Search Report (PCT/ISA/210) dated Dec. 12, 2013 (Three (3) pages).
Chinese Office Action issued in Chinese counterpart application No. 201380065551.X dated Jan. 12, 2017, with partial English translation (Eleven (11) pages).

* cited by examiner

METHOD FOR COMBINED DETERMINING OF A MOMENTARY ROLL ANGLE OF A MOTOR VEHICLE AND A MOMENTARY ROADWAY CROSS SLOPE OF A CURVED ROADWAY SECTION TRAVELED BY THE MOTOR VEHICLE

BACKGROUND AND SUMMARY OF THE INVENTION

The invention relates to a method for the combined determining of a momentary roll angle of a motor vehicle and a momentary roadway cross slope of a curved roadway section travelled by the motor vehicle as well as a device for the combined determining of this momentary roll angle and this momentary roadway cross slope. The invention furthermore relates to a motor vehicle having such a device.

Electro-hydraulically active chassis systems are known by the term "Active Body Control (ABC)", which, besides a conventional spring and dampener function, also allow the possibility of the targeted setting of pitch and roll angles. A roll is therein referred to as a rotational movement of a motor vehicle around its longitudinal axis. Such a roll movement can result during travelling of a curved roadway section by the motor vehicle if the motor vehicle inclines outwards around a determined roll angle due to the occurring centrifugal forces. The roll angle set here depends on the transverse acceleration of the motor vehicle, the center of gravity height, the chassis construction of the motor vehicle as well as the speed thereof.

The centrifugal forces occurring during travelling of the curved roadway section are often uncomfortable to experience for the passengers of the motor vehicle and can therefore lead to a considerable reduction of the driving comfort. A possibility to reduce the comfort-reducing effect of such undesired transverse forces on the passenger of the motor vehicle consists in implementing incline technology in the motor vehicle by means of "Active Body Control (ABC)", as has already been used for a long time in rail vehicles. By using such incline technology, it is possible for the motor or rail vehicle not to incline outwards during travelling of a curved roadway or rail section, but rather in the opposite direction, so inwards, due to corresponding control of a chassis of the motor vehicle. For this purpose, the chassis can be provided with suitable actuators, for example in the manner of height-adjustable struts which connect the vehicle frame to each wheel of the motor vehicle in a height-adjustable manner, such that a determined roll angle of the motor vehicle can be set.

As the centrifugal forces occurring during travelling of the curved roadway section depend on different factors, such as for example a roadway curvature of the roadway section or the momentary speed, the roll angle to be set in the sense of an incline technology on the chassis of the motor vehicle must also be determined depending on these parameters in order to ensure as high a level of driving comfort as possible for the passengers. In order to achieve maximum driving comfort, it can be required to also consider a momentary roadway cross slope of the curved roadway section being travelled by the motor vehicle during the setting of a determined roll angle in the motor vehicle. This is because, often, the roadway travelled by the motor vehicle is not aligned horizontally in its transverse direction with regard to a direction vector of the center of gravity serving as a reference, which defines a horizontal plane of the earth's surface, but rather is inclined relative to this "horizontal reference plane". In particular, a curved roadway section can be inclined outwards with regard to the curvature of its curve, for example in order to facilitate a draining of rainwater accumulating on the vehicle surface, among other things. On the other hand, the roadway can also incline inwards in the manner of a so-called curve superelevation in the curve direction in order to facilitate the travelling of the curved roadway section for the motor vehicle. This means, however, that, in any case, the roadway cross slope of the roadway relative to the horizontal reference plane must be considered when controlling a chassis of the motor vehicle for the setting of an optimum roll angle of the motor vehicle.

DE 10 2010 046 317 A1 describes a method to set the spatial position of a roll axis around which the motor vehicle is able to rotate at a predetermined roll angle. According to the method, firstly in a first step, a spatial target position of the position of the roll axis is set and subsequently in a second step, a transverse acceleration of the motor vehicle is determined. In a third step, a target cross slope of the motor vehicle and target transverse offset of the motor vehicle is finally determined depending on the transverse acceleration such that when setting the target cross slope and the target transverse offset, a transfer of the roll axis into the target position is caused. In order to ensure that the motor vehicle occupies the target cross slope determined in the previous step, at least one actuator of an active chassis device of the motor vehicle is adjusted accordingly. Additionally, at least one actuator to influence the transverse movement of the motor vehicle is adjusted in such a way that the motor vehicle additionally also occupies the target transverse offset determined in the previous step. The expected transverse acceleration can, for example, be determined with the aid of a camera system attached to the motor vehicle, which optically detects the curved roadway section in front of the motor vehicle which is to be travelled and analyzes it to determine the expected transverse acceleration.

DE 10 2006 018 978 A1 describes a method for determining a roll angle of a motor vehicle having at least one device for determining the yaw rate or a value correlated thereto as well as a device for determining the vehicle speed and, if necessary, a camera system which is directed forwards. The roll angle is determined by using the yaw rate or a value correlated thereto and the specific roll spring stiffness of the vehicle.

An object of the present invention is to specify an improved embodiment for a method for the combined determining of a momentary roll angle of a motor vehicle and a momentary roadway cross slope of a curved roadway section travelled by the motor vehicle. It is likewise an object of the present invention to specify a device for determining such a momentary roadway cross slope.

The invention is based on the general idea of determining both the overall momentary vehicle roll angle of the motor vehicle relative to a horizontal reference plane and a momentary roadway cross slope of the curved roadway section travelled by the motor vehicle relative to the horizontal reference plane from the chassis data and the transverse dynamics data of the motor vehicle travelling the roadway section, during travelling of a curved roadway section. Thus, as has already been explained, a plane running in parallel to a direction vector of the gravitational acceleration is meant by horizontal reference plane; the roadway section travelled by the motor vehicle in the transverse direction can be inclined relative to this reference plane.

The method according to the invention can be implemented in a simple manner in a motor vehicle, as chassis data and also transverse dynamics data for a great variety of purposes can be determined as standard by means of the sensor system integrated into the motor vehicle and, for example, can be transmitted to a control device integrated into the motor vehicle, wherein the control device controls different vehicle components, in particular the chassis, of the motor vehicle based on this data.

The method according to the invention can be implemented in real time in a motor vehicle, in particular in a control device (ECU) integrated into the motor vehicle, such that this data can be considered, if necessary, during the control of the chassis of the motor vehicle or further vehicle components based on the roadway cross slope or the momentary vehicle roll angle determined by means of the method according to the invention.

In a preferred embodiment, the chassis data comprises a momentary tire roll angle of the tires of the motor vehicle or/and a momentary chassis roll angle of the chassis of the motor vehicle. The momentary chassis roll angle can be determined by means of a suitable sensor which is integrated into the struts of the chassis. Alternatively to this, however, it can also be conceived that the determination of the chassis roll angle occurs without such a sensor system, for example if the struts of the chassis are controlled directly by means of the control device to set a determined vehicle roll angle. In this case, the set chassis roll angle can also be read directly from the control device which controls the struts of the chassis. The same applies for the tire roll angle of the tires of the motor vehicle which can depend, in particular, on a wheel load change between the left and the right tires of the motor vehicle as well as a tire pressure-dependent stiffness of the tires and therefore can be determined by means of suitable (tire pressure) sensors integrated into the tires of the motor vehicle. According to this embodiment, the transverse dynamics data comprises a momentary transverse acceleration of the motor vehicle. The momentary transverse acceleration of the motor vehicle can thus be determined by means of an acceleration sensor integrated into the motor vehicle.

In a particularly preferred embodiment, the method according to the invention can comprise two consecutive method steps S1 and S2. In the first method step S1, the momentary vehicle roll angle $\phi A$ is calculated from the momentary transverse acceleration ay, the momentary speed vx and the momentary yaw speed $d/dt\ \psi$ of the motor vehicle according to the equation $\phi A=(1/g)\ (ay-vx\ d/dt\ \psi)$. In a second step S2, then the momentary roadway cross slope ($\phi FB$) is calculated from the momentary vehicle roll angle ($\phi A$), calculated in step S1, a momentary chassis roll angle (w) and a momentary tyre roll angle ($\phi R$) according to the equation $\phi FB=\phi A-w-\phi R$.

In a particularly preferred embodiment, it can be conceived that the determination of the momentary roadway cross slope occurs using GPS-based map material of the travelled curved roadway section, interacting with a GPS receiver for determining the momentary vehicle position of the motor vehicle. Since, even in modern map material, information with regard to local roadway cross slopes is not present or is only present with a low level of accuracy, such a use in the first instance can occur only in a supplementary way during the determination of the momentary roadway cross slope according to the invention.

The invention also relates to a device for the combined determining of a momentary vehicle roll angle of a motor vehicle and a momentary roadway cross slope of a curved roadway section travelled by the motor vehicle. The device according to the invention comprises a control device which is able to be connected for communication to a transverse acceleration sensor, a yaw rate sensor and a speed sensor of the motor vehicle for the transmission of a respectively measured momentary transverse acceleration or momentary speed to the control device. The control device determines the momentary vehicle roll angle of the motor vehicle and the momentary roadway cross slope of the curved roadway section travelled by the motor vehicle from chassis data and transverse dynamics data which comprise the momentary transverse acceleration or momentary speed of the motor vehicle by applying the method according to the invention.

The invention also relates to a motor vehicle having a device which is explained above, as well as having a transverse acceleration sensor, a yaw rate sensor and a speed sensor which are each connected for communication to the control device for the transmission of a measured momentary transverse acceleration, a momentary yaw speed or a momentary speed of the motor vehicle.

Further important features and advantages of the invention result from the sub-claims, from the drawings and from the relevant description of the figures, by means of the drawings.

It is to be understood that the features referred to above and still to be explained below are not only able to be used in the respectively specified combination, but also in other combinations or alone, without leaving the scope of the present invention.

Preferred exemplary embodiments of the invention are depicted in the drawings and are explained in more detail in the following description, wherein the same reference numerals refer to the same or similar or functionally identical components.

BRIEF DESCRIPTION OF THE DRAWINGS

FIG. 2 is a motor vehicle having a device according to the invention to set the curve incline of a motor vehicle, wherein FIG. 2a shows a top view and FIG. 2b shows a back view of the motor vehicle.

DETAILED DESCRIPTION OF THE DRAWINGS

Figure 1:
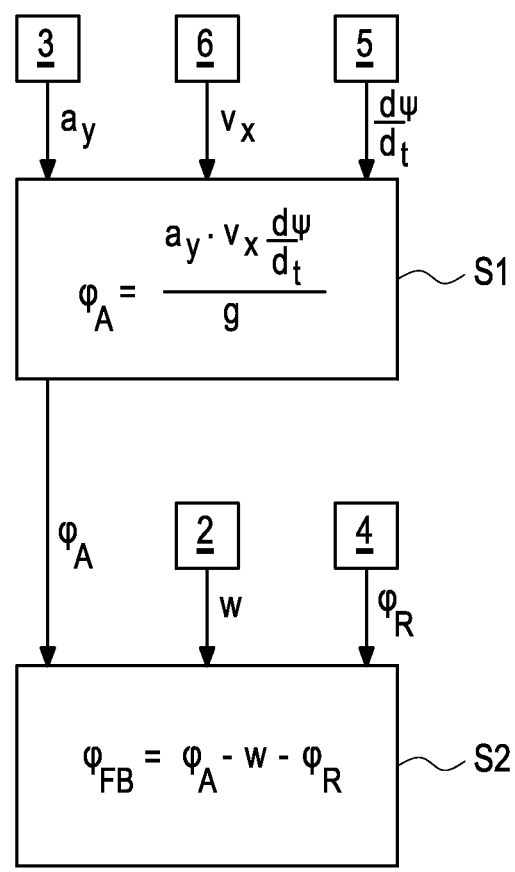
FIG. 1 is a roughly schematic flow diagram of the method according to the invention.

In FIG. 1, a flow diagram of the method according to the invention is depicted roughly schematically, according to which, in a first step S1, firstly a momentary roll angle $\phi A$ of the motor vehicle 1 relative to a horizontal reference plane 21 (cf. FIG. 2b) is determined and in a subsequent step S2, the momentary roadway cross slope $\phi F$ of the curved roadway section 20 being travelled by the motor vehicle 1 is determined relative to the reference plane 21.

Here, the horizontal reference plane 21 is set via the direction vector $\vec{g}$ of the center of gravity which extends in the orthogonal direction to the reference plane 21.

To calculate the roll angle $\phi_A$, knowledge of the momentary speed $v_x$ of the motor vehicle 1 is required, which can be determined by means of a speed sensor 6 integrated into the motor vehicle 1. Furthermore, for the calculation of the roll angle $\phi A$ a knowledge of the momentary transverse acceleration $a_y^{Sensor}$ is also required, which in turn is able to be determined by means of a transverse acceleration sensor 3 integrated into the motor vehicle 1.

In the transverse acceleration $a_y^{Sensor}$ measured by the transverse acceleration sensor 3, according to the equation $$a_y^{Sensor}=a_y\ \cos\ \phi_A+g\ \sin\ \phi_A$$

so-called "g proportions" caused by the center of gravity are obtained. In the equation above, g is the gravitational acceleration and ay is the transverse acceleration without the g proportion. For small roll angles ϕA this equation can be simplified by means of Taylor expansion as follows:

$$a_y^{Sensor} = a_y + g\,\phi_A$$

From the equation which is known to the person skilled in the art and describes the driving dynamics of a motor vehicle $$a_y^{Sensor} = d/dt\, v_y + v\, d/dt\, \psi$$

it follows, for small speed changes (d/dt $v_y \approx 0$) by combination with the above equation:

$$\phi_A = (1/g)\,(a_y^{Sensor} - v_x\, d/dt\, \psi)$$

The roll angle $\phi_A$ can also be calculated from this equation. Here, d/dt ψ is the yaw speed of the motor vehicle 1 which can be determined by means of a yaw rate sensor 5.

Figure 2A:
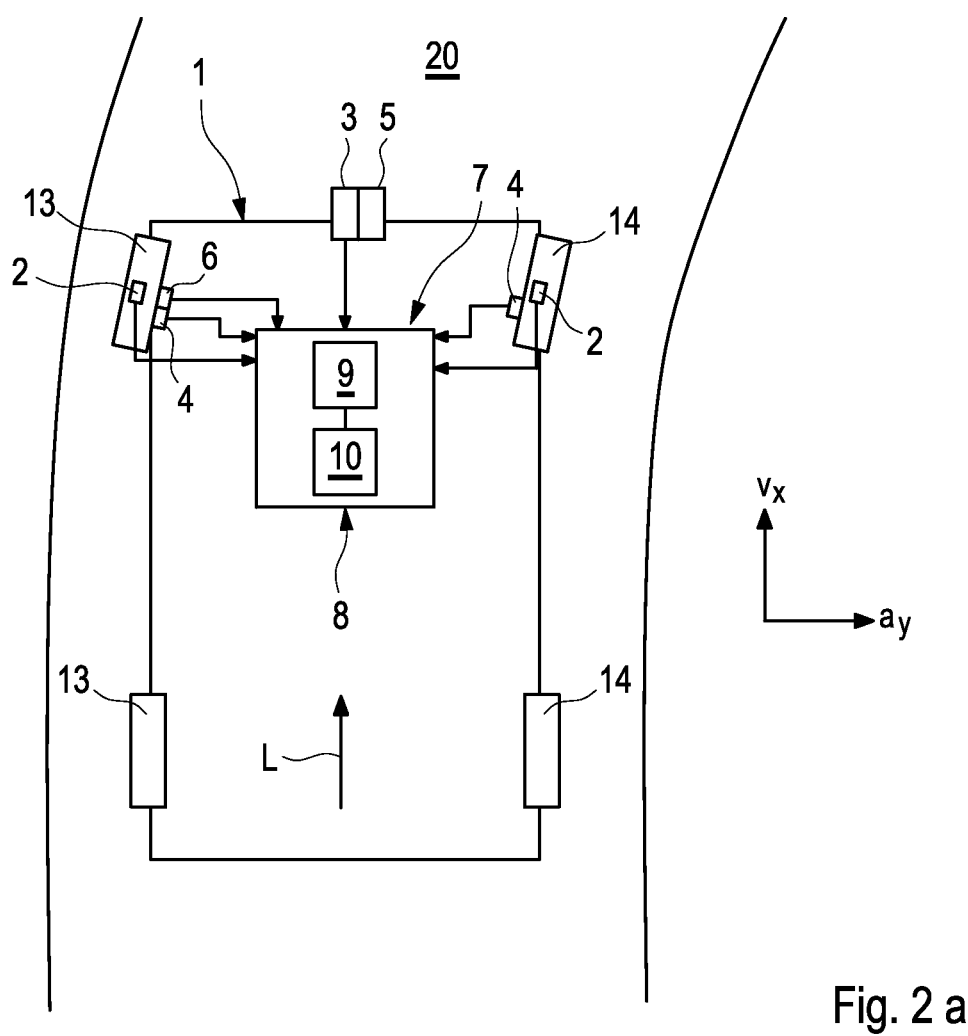

By using the different indices y and x, it is therefore expressed that a direction vector of the momentary transverse acceleration $a_y^{Sensor}$ (in the Y direction) points in an orthogonal direction to the corresponding direction vector of the momentary speed $v_x$ of the motor vehicle (in the X direction) (cf. also FIG. 2a). The Z direction runs orthogonally to both the X and the Y direction.

The sensor output data of the acceleration sensor 3, therefore the momentary transverse acceleration $a_y^{Sensor}$, can be filtered by means of a suitable low-pass filter in order to filter out undesired high-frequency disturbances (for example due to unevenness in the roadway section 20 being travelled).

Advantageously, the acceleration sensor 3 is arranged in the motor vehicle as far as possible to the front of the motor vehicle with regard to a vehicle longitudinal direction L of the motor vehicle 10 (cf. FIG. 2a).

In step S2, the sought-after roadway cross slope $\phi_{FB}$ is now calculated, based on a roll angle $\phi_A$ calculated in step S1, using the equation $$\phi_{FB} = \phi_A - w - \phi_R.$$

Here, w is a momentary chassis roll angle set in the chassis of the motor vehicle and ϕR is a tire roll angle of the tires 13, 14 of the motor vehicle. In a simplified variant, the tire roll angle ($p_a$ can also be ignored ($\phi_R = 0$).

For the implementation of step S2, the momentary chassis roll angle w can be determined by means of suitable sensors 2. These sensors can determine a momentary height $x_l$, $x_r$ of the height-adjustable struts 11, 12 allocated to the left or right tires 13, 14 of the motor vehicle 1, such that the momentary chassis roll angle w can be determined from the height difference $\Delta x = |x_l - x_r|$ of the momentary height $x_l$ of the left strut 11 relative to a momentary height $x_r$ of the right strut 12.

The tire roll angle $\phi_R$ can also be determined in an analogous manner by means of suitable sensors 4. For this purpose, a height difference $\Delta y = |y_l - y_r|$ of a momentary height $y_l$, $y_r$ of the left tire 13 relative to the right tire 14 can be determined by means of such sensors 4. This height difference Δy can depend on a different wheel load of the left and right tires 13, 14 of the motor vehicle 1 as well as a different tire pressure-dependent stiffness of the left or right tires 13, 14. The sensors 4 can therefore comprise tire pressure sensors to measure the individual tire pressure in the tires 13, 14.

Figure 2:
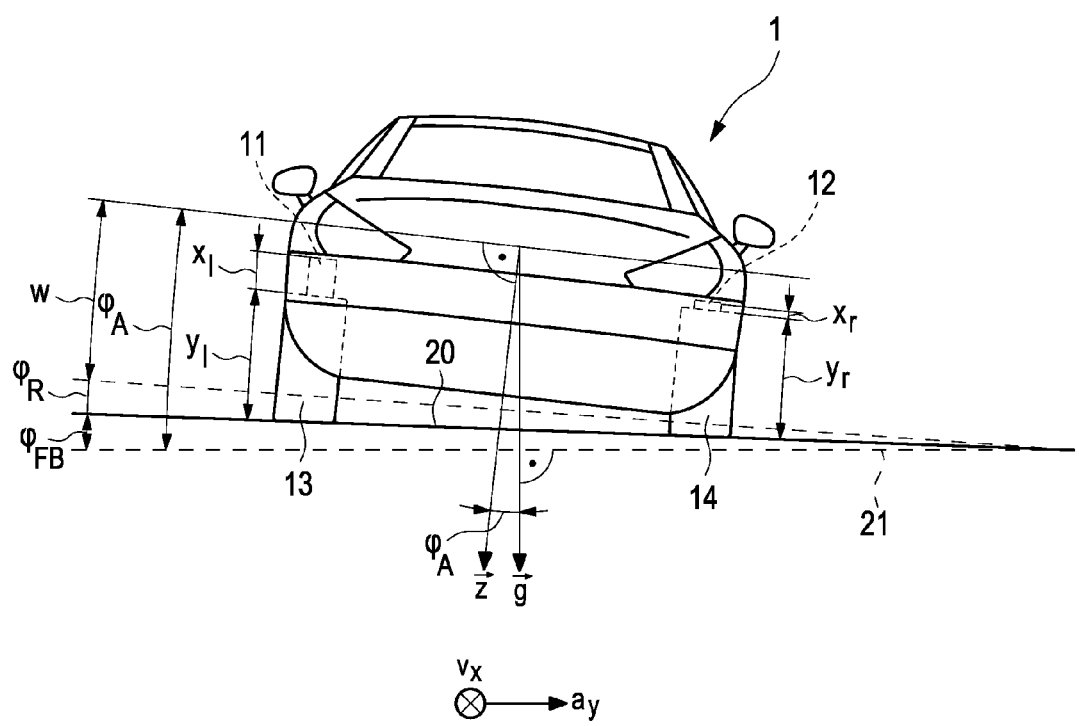

In the depiction of FIG. 2, the motor vehicle 1 having a device 7 according to the invention for the implementation of the method according to the invention is now shown. FIG. 2a shows the motor vehicle 1 in a top view; FIG. 2b shows it in a rear view. The motor vehicle 1 comprises a control device 8 as well as an acceleration sensor 3, a yaw rate sensor 5, and a speed sensor 6 which are each connected for communication to the control device 8.

The motor vehicle 10 comprises a chassis device which is able to be controlled by the control device 8, which can be formed in the manner of an electro-hydraulic active chassis. The chassis device comprises four actuators 11, 12 formed as height-adjustable struts, wherein an actuator 11, 12 is allocated to each wheel 13, 14 of the motor vehicle 10. By an individual adjustment of the height of the actuators 11, 12, a determined roll angle $\phi_A$ can be set in the motor vehicle 10.

Alternatively to the electro-hydraulic chassis device described above, a pneumatic spring-based chassis having a closed pressure supply can also be used. In such a pneumatic spring-based chassis, to adjust the struts, the air is pumped into a closed circuit by an air cell in the pneumatic spring and reversed, which enables a very quick transfer in and out of the struts to set the target curve incline in the chassis of the motor vehicle.

In a further alternative to the electro-hydraulic active chassis, a chassis which is known by the term "ACTIVE CURVE SYSTEM" and which is hydraulically adjustable can be used, which works with an hydraulic pump driven by a belt drive and has an oil container in the motor chamber as well as a valve block and active stabilizer on each of the front and rear axles. Also, such a hydraulic chassis device can be used to set the target curve incline in the motor vehicle.

For the implementation of the method according to the invention, the acceleration sensor 3 transmits the momentary sensor transverse acceleration ay, the speed sensor 6 transmits the momentary speed $v_x$ and the yaw rate sensor 5 of the motor vehicle 1 transmits the momentary yaw speed d/dt ψ to the control device 8. The control device 8 can comprise a control unit 9 (ECU) and a storage unit 10 which is connected for communication to the control unit 9. The control unit 9 and the storage unit 10 can be formed in the manner of a conventional microcontroller, wherein numerous technical implementation possibilities are known to the person skilled in the art.

The method according to the invention is implemented in the control device 8 using the input parameters referred to above (momentary speed of the motor vehicle $v_x$, yaw speed d/dt ψ, momentary sensor transverse acceleration $a_y^{Sensor}$). The momentary vehicle roll angle $\phi_A$ of the motor vehicle is calculated by the control device 8 for this purpose according to step S1 of the method according to the invention. From the momentary vehicle roll angle $\phi_A$, according to step S2, the momentary roadway cross slope $\phi_{FB}$ of the curved roadway section 20 being travelled is calculated.

To determine the momentary chassis roll angle w in the scope of the implementation of step S2, the device 7 according to the invention has suitable chassis sensors 2 which determine each momentary height $x_l$, $x_r$ of the height-adjustable struts, 11, 12, such that the control device 8 can determine the momentary chassis roll angle 2 from the height difference $\Delta x = |x_l - x_r|$ of the momentary height $x_l$ of the struts 11 allocated to the two left tires 13 relative to the momentary height $x_r$ of the struts 12 allocated to the two right tires 14. In an analogous manner, the tire roll angle $\phi_R$ can also be determined by means of the (tire pressure) sensors 4.

In a developing variant, it can also be conceived to determine the momentary chassis roll angle w not as explained above by means of a suitable sensor system 2; rather, according to this alternative, it can be conceived to calculate an optimum target roll angle $w_{Soll}$ by means of a suitable method, for example depending on determined input parameters such as, for example, the momentary transverse acceleration $a_y^{Sensor}$ and the momentary speed $v_x$ of the motor vehicle 1 and a momentary roadway curvature K of the roadway section 20 being travelled from these initial parameters, the target roll angle $w_{Soll}$ being set in the struts 11, 12 of the chassis of the motor vehicle 1 in order to reduce transverse forces acting on the passengers of the motor vehicle 1 during travelling of the curved roadway section 20 and thus to increase the driving comfort for the passenger. The calculation of the target roll angle $w_{Soll}$ thus firstly occurs depending on the momentary roadway cross slope $\phi_{FB}$. The calculation of the target roll angle $w_{Soll}$ can, for example, be carried out by the control unit 9 of the control device 8. The height-adjustable struts 11, 12 can therein be controlled by the control device 8 such that the desired target roll angle $w_{Soll}$ is set in the chassis of the motor vehicle 1. Since, in the case of such a simplified calculation of the target roll angle $w_{Soll}$, the momentary roadway cross slope $\phi_{FB}$ remains unconsidered, it is offered to calculate this by means of the method according to the invention and to consider this during the setting of the chassis roll angle $w_{Soll}$ using the struts 11, 12 of the vehicle.

The invention claimed is:

1. A method for combined determining of a momentary vehicle roll angle of a motor vehicle and a momentary roadway cross slope of a curved roadway section traveled by the motor vehicle, comprising the steps of:
   receiving a measured momentary transverse acceleration, a measured momentary yaw speed, and a measured momentary speed of the motor vehicle transmitted by a transverse acceleration sensor, a yaw rate sensor, and a speed sensor of the motor vehicle, respectively, at a control device; and
   determining the momentary vehicle roll angle and the momentary roadway cross slope by the control device from chassis data and transverse dynamics data of the motor vehicle;
   wherein the chassis data comprises a momentary chassis roll angle of a chassis of the motor vehicle and a momentary tire roll angle of tires of the motor vehicle and wherein the transverse dynamics data comprises the measured momentary transverse acceleration of the motor vehicle;
   wherein the step of determining the momentary vehicle roll angle includes a step (S1) of calculating the momentary vehicle roll angle ($\phi_A$) from the measured momentary transverse acceleration ($a_y^{sensor}$), the measured momentary speed ($v_x$) of the motor vehicle, and the measured momentary yaw speed ($d/dt\Psi$) of the motor vehicle according to the following equation:

$$\phi_A = (1/g)(a_y^{Sensor} - v_x \, d/dt\Psi),$$

where g is gravitational acceleration;
   wherein the step of determining the momentary roadway cross slope includes calculating the momentary roadway cross slope ($\phi_{FB}$) from the momentary vehicle roll angle ($\phi_A$) calculated in step S1, the momentary chassis roll angle (w), and the momentary tire roll angle ($\phi_R$) according to the following equation:

$$\phi_{FB} = \phi_A - w - \phi_R;$$

wherein the momentary chassis roll angle is determined from a height difference of a momentary height of a left strut of the motor vehicle relative to a momentary height of a right strut of the motor vehicle;
   and wherein the momentary tire roll angle of tires is determined from a height difference of a momentary height of a left tire of the motor vehicle relative to a momentary height of a right tire of the motor vehicle.

2. A device for combined determining of a momentary vehicle roll angle of a motor vehicle and a momentary roadway cross slope of a curved roadway section traveled by the motor vehicle, the device comprising:
   a transverse acceleration sensor;
   a yaw rate sensor;
   a speed sensor; and
   a control device configured to perform the method of claim 1.

* * * * *